United States Patent
Ohmori

(10) Patent No.: US 8,020,086 B2
(45) Date of Patent: Sep. 13, 2011

(54) INFORMATION PROCESSING METHOD, INFORMATION PROCESSING MACHINE, AND STORAGE MEDIUM FOR PROCESSING DOCUMENT DATA THAT INCLUDES LINK INFORMATION

(75) Inventor: Seiji Ohmori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 10/984,761

(22) Filed: Nov. 10, 2004

(65) Prior Publication Data
US 2005/0141019 A1   Jun. 30, 2005

(30) Foreign Application Priority Data
Nov. 12, 2003   (JP) .................... 2003-383025

(51) Int. Cl.
*G06F 17/00*   (2006.01)
(52) U.S. Cl. .................. 715/208; 715/234; 715/205
(58) Field of Classification Search .................. 715/234, 715/205, 208
See application file for complete search history.

(56) References Cited

U.S. PATENT DOCUMENTS

| | | | | |
|---|---|---|---|---|
| 5,794,259 | A * | 8/1998 | Kikinis ................. | 715/207 |
| 6,195,684 | B1 * | 2/2001 | Watanabe et al. ........... | 709/204 |
| 6,219,680 | B1 * | 4/2001 | Bernardo et al. ........... | 715/234 |
| 6,266,683 | B1 * | 7/2001 | Yehuda et al. ............. | 715/234 |
| 6,442,651 | B2 * | 8/2002 | Crow et al. .............. | 711/118 |
| 6,553,393 | B1 * | 4/2003 | Eilbott et al. ............ | 715/207 |
| 6,769,009 | B1 * | 7/2004 | Reisman ................ | 709/201 |
| 7,055,169 | B2 * | 5/2006 | Delpuch et al. ............ | 725/100 |
| 7,231,426 | B1 * | 6/2007 | Hall et al. ............... | 709/206 |
| 7,340,499 | B1 * | 3/2008 | Casella ................. | 709/201 |
| 2001/0052003 | A1 * | 12/2001 | Seki et al. ............... | 709/219 |
| 2002/0065800 | A1 | 5/2002 | Morlitz ................. | 707/1 |
| 2003/0007695 | A1 * | 1/2003 | Bossut et al. ............. | 382/239 |
| 2003/0140121 | A1 * | 7/2003 | Adams ................. | 709/219 |
| 2003/0184582 | A1 * | 10/2003 | Cohen ................. | 345/736 |
| 2004/0243818 | A1 * | 12/2004 | Hamlett et al. ............. | 713/193 |
| 2006/0080603 | A1 * | 4/2006 | Bailey et al. ............. | 715/530 |

FOREIGN PATENT DOCUMENTS

| | | |
|---|---|---|
| JP | 11-212962 A | 8/1999 |
| JP | A 2001-034522 | 2/2001 |
| JP | A 2001-092706 | 4/2001 |
| JP | A 2002-082795 | 3/2002 |
| JP | 2002-229842 A | 8/2002 |

OTHER PUBLICATIONS

Kato et al., Mac Fan Special 12, Dreamweaver & Fireworks & Flash, Mainichi Communications Inc., pp. 21-62, Nov. 24, 2000. (Partial English translation of p. 61.).

* cited by examiner

*Primary Examiner* — Thu V Huynh
(74) *Attorney, Agent, or Firm* — Fitzpatrick, Cella, Harper & Scinto

(57) ABSTRACT

There is disclosed an information processing apparatus which can minimize the probability of a partner being incapable of referring to data at a link destination when a structured document is transmitted to another apparatus or application or the risk of transmission of data unnecessary for the partner, suppress any wasteful data transmission, and properly cope with the intention of the manager of the apparatus or the creator of the structured document about the data transmission. In this information processing apparatus, data at a link destination is embedded in document data, and the document data is transmitted to another apparatus. In transmitting the document data, it is determined whether to transmit the document data after the data at the link destination is embedded in it.

13 Claims, 10 Drawing Sheets

FIG. 3

```
<sample>
    <title> PHOTO 1 </title>
    <date>2003/12/25</date>
    <place>Tokyo</place>
    <number>00235</number>
    <image send = "YES" embed = "YES" xlink:href = "./img/sample.jpg"/>
    <user>G.F.Jones</user>
</sample>
```

FIG. 4

```
<sample>
  <title> PHOTO 1 </title>
  <date>2003/12/25</date>
  <place>Tokyo</place>
  <number>00235</number>
  <image send = "YES" embed = "YES" xlink:href = "data:image/jpg;base64,
5zOdl49cxgjuAv8ATB5YaAYUwPPEPBIUXxLYBJQDLYDnbVSDEOsbr12+ITDzQ8U1k7N5Awj3gWGK
iVBORw0KGgoAAAANSUhEUgAAAKADAAB4CAIAAAD6wG44AAAQHEIEQVR4nO2da1AUV9rH/z0zPcMA
yuAIAiCAjHlJQhEiiR4YaPivrqWWuYt36ib6HpJsZXNVip+cM2GmMKUGgtjTNZdV8u3u3u3u3u3KilL3cVs
xai+olExrllGiNzEFTDAcBlwBgbmPtP7oROWgBGZOX2ZWX6tdOh+ztP973NOn3Oe8zTfMzG8/ok
QjswDreMC+zjjAvs44w w7OP8xwrsAoYAm9Bucl5MaAd4wwy0Ar1AD2AFGMAGSAE5MA2lBqYK7SEn
E+0CrvKrLgA7MAhviYTxFoEZoBy4zXXu5ijGuVYgObxG4EggX2gObxG4EggX2gObxG4EggX2gObxG4EggX2gObxG4EggX2gObxG4EggX2gO
hPbBixG5wG1AudA+eDdiFrgbOM/LblYvl1qBzcBFwCG0G16POAW2AV8CRqHdAEADAUL74BEiFJgB
rgK9QrvBlgOUQwvgESIU+AbwT6F9GMbrQ2jFJnArUCO0DyOZLLQeAMsAItBsj8tBBfaAU8R
j8BO4LKHC/iXLzf19Dz4asYwjM3m9lgr11znM5tFjr11znM5tFjr11znM5tFjr11znM5tFjr11znM5tFj
UL4+TLIAd4G7QNdoR6qADCAGoPjwiy98WGAzcAtoBCxjOetpYC4g5cop3oftYC4g5cop3oftYC4g5cop3oft
5zOdl49cxgjuAv8ATB5YaAYUwPPEPBIUXxLYBJQDLYDnbVIDEOsbr12+ITDzQ8U1k7N5Awj3gWGK
xvi+olExrllGiNzEFTDAcBlwBgbmPtP7oROWgBGZOX2ZWX6tdOh+ztP973NOn3Oe8zTFMAzG8/ok
DwjsAMqAf5KouCPpATqAaURtCon3P6FGoAS4Q1pdAAxQR9qmAHh1DW4HviLaLD9AG+Dw8IvkrTWY
AeqB/+NSXbaUdi7t84GXCnwDuAo4uS+0m/siuMXr2h8ncl3H3r3GPr4K4wrsEdgJXgDs8Iuj1AntR
eaxSXvxg6u8AAAAASUVrOK5CYII=" />
  <user>G.F.Jones</user>
</sample>
```

INFORMATION PROCESSING METHOD, INFORMATION PROCESSING MACHINE, AND STORAGE MEDIUM FOR PROCESSING DOCUMENT DATA THAT INCLUDES LINK INFORMATION

FIELD OF THE INVENTION

The present invention relates to an information processing method of causing an information processing apparatus such as a file server apparatus to process information, an information processing apparatus to execute the information processing method, a program to implement the information processing method, and a storage medium which stores the program.

BACKGROUND OF THE INVENTION

For structured documents such as XML (eXtensible Markup Language) or HTML (Hyper Text Markup Language) documents, a link description method to refer to another file or data is prepared. In, e.g., HTML, an image file can be used in part of display by using an "img" element, or a hyperlink function to another file can be implemented by using an "a" element.

For such structured documents, conventionally, a method of selectively embedding data at a link destination in a document has been used.

In HTML, a method of archiving a structured document together with a file at a link destination and then transmitting the document has been used.

However, when such a structured document is transmitted to another apparatus, it is sometimes impossible for the partner to refer to data at a link destination because of the state of this data, the terminal environment of the transmission partner, or the link information description method. For example, the data at the link destination cannot be referred to because of the limitation on access from the terminal of the transmission partner to the data.

To solve this problem, the data at the link destination is transmitted together with the structured document. Alternatively, the structured document is archived together with the data at the link destination and then transmitted. However, if the partner can refer to the data at the link destination, the transmitted data is unnecessary for the partner.

As a result, when the storage area of the apparatus of the partner is small, the transmitted data at the link destination may put a squeeze on the storage area of the partner.

In addition, even when the manager of the apparatus or the creator of the structured document has an intention to avoid transmission of the data at the link destination to the partner, there is no useful means prepared.

SUMMARY OF THE INVENTION

The present invention has been made in consideration of the above problem and provides an information processing method and information processing apparatus which can minimize the probability of a partner being incapable of referring to data at a link destination when a structured document is transmitted to another apparatus or application or the risk of transmission of data unnecessary for the partner, suppress any wasteful data transmission, and properly cope with the intention of the manager of the apparatus or the creator of the structured document about the data transmission, and a program and storage medium thereof.

According to one aspect of the present invention, preferably, an information processing method of processing a structured document which makes it possible to refer to another data by describing link information in document data, comprising: a data embedding step of embedding data at a link destination in the document data; a document transmission step of transmitting the document data to another apparatus; and an embedding determination step of, in transmitting the document data in the document transmission step, determining whether to transmit the document data including the data at the link destination embedded in the data embedding step.

According to another aspect of the present invention, preferably, an information processing method of processing a structured document which makes it possible to refer to another data by describing link information in document data, comprising: a data archiving step of archiving the document data together with data at a link destination; a document transmission step of transmitting the document data to another apparatus; and an archiving determination step of, in transmitting the document data in the document transmission step, determining whether to transmit the archived document together with the data at the link destination in the data archiving step.

According to further aspect of the present invention, preferably, an information processing apparatus for processing a structured document which makes it possible to refer to another data by describing link information in document data, comprising: data embedding means for embedding data at a link destination in the document data; document transmission means for transmitting the document data to another apparatus; and embedding determination means for, in transmitting the document data by the document transmission means, determining whether to transmit the document data including the data at the link destination embedded by the data embedding means.

According to another and further aspect of the present invention, preferably, an information processing apparatus for processing a structured document which makes it possible to refer to another data by describing link information in document data, comprising: data archiving means for archiving the document data together with data at a link destination; document transmission means for transmitting the document data to another apparatus; and archiving determination means for, in transmitting the document data by the document transmission means, determining whether to transmit the archived document data together with the data at the link destination by the data archiving means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 3 is a view showing an example of structured documents processed by the information processing apparatus according to the first embodiment of the present invention;

FIG. 4 is a view showing an example of structured documents processed by the information processing apparatus according to the first embodiment of the present invention, in which a file at a link destination is embedded;

DETAILED DESCRIPTION OF THE PREFERRED EMBODIMENTS

The embodiments of an information processing method, information processing apparatus, program, and storage medium according to the present invention will be described with reference to the accompanying drawings.

A. First Embodiment

The first embodiment of the present invention will be described with reference to FIGS. 1 to 5.

In this embodiment, a file server apparatus will be exemplified as the information processing apparatus of the present invention.

Figure 1:
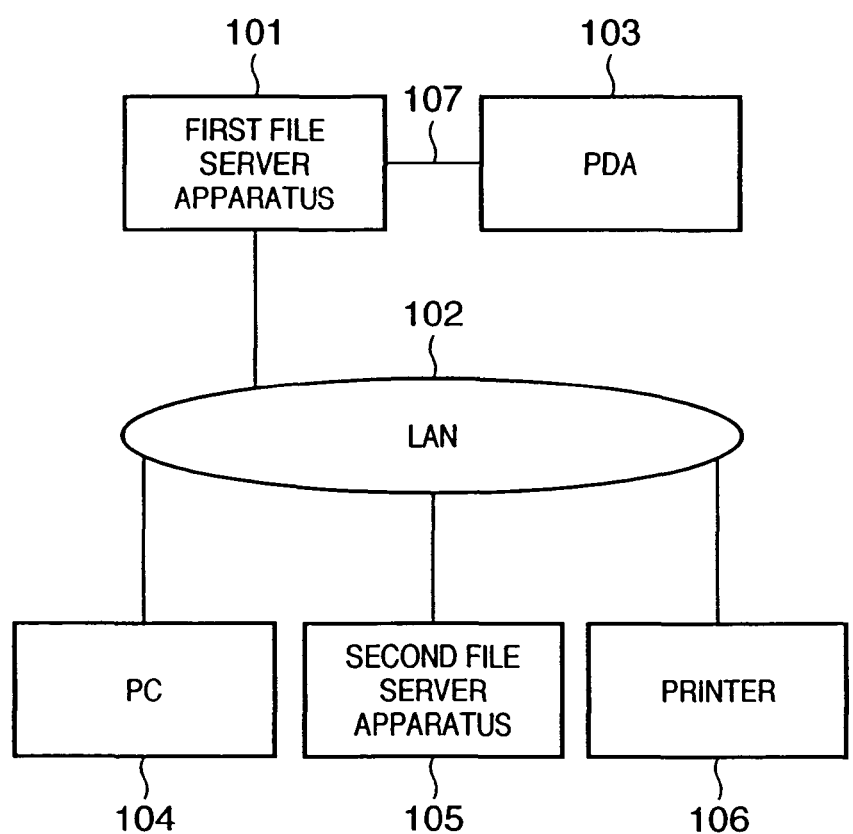
FIG. 1 is a block diagram showing the schematic arrangement of a network including an information processing apparatus according to the first embodiment of the present invention.

FIG. 1 is a block diagram showing the schematic arrangement of an information processing system including a file server apparatus according to the first embodiment of the present invention.

The information processing system shown in FIG. 1 includes a first file server apparatus 101 as the information processing apparatus according to this embodiment, LAN (Local Area Network) 102, PDA (Personal Digital Assistants) 103, PC (Personal Computer) 104 serving as a client, second file server apparatus 105 as the information processing apparatus according to this embodiment, printer (network printer) 106, and USB 107.

The first file server apparatus 101, PC 104, second file server apparatus 105, and printer 106 are connected to the LAN 102. The PDA 103 is connected to the first file server apparatus 101 through the USB 107.

In the state shown in FIG. 1, the first file server apparatus 101 and PDA 103 are connected. The PDA 103 is portable and can therefore be disconnected from the first file server 101.

Figure 2:
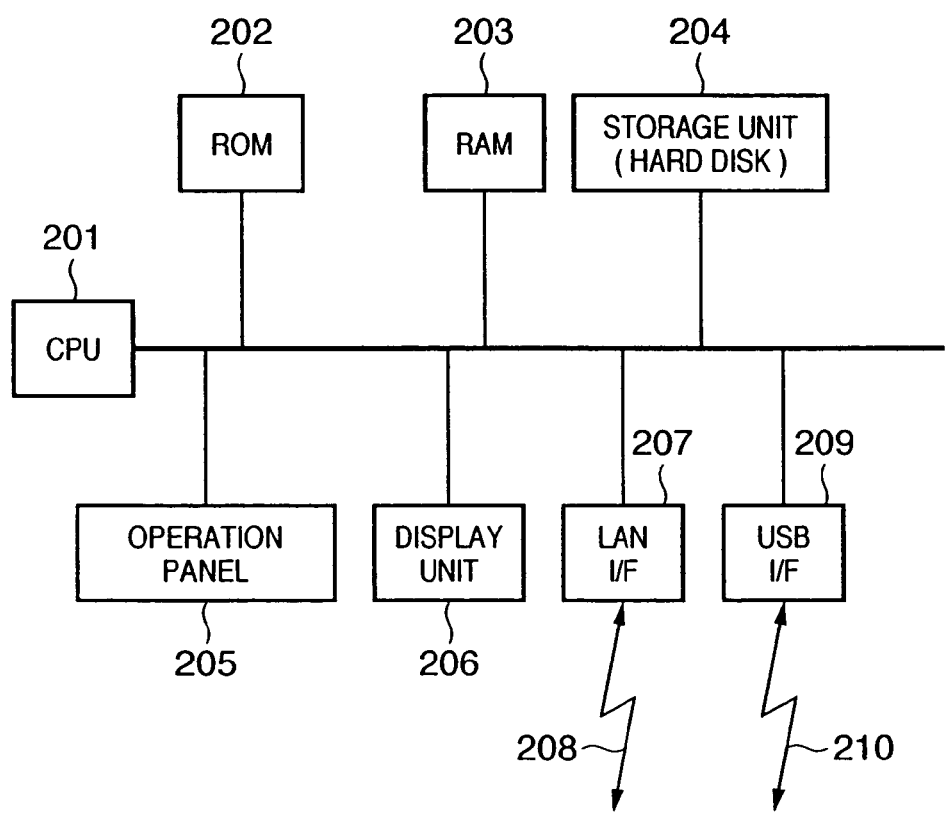
FIG. 2 is a block diagram showing the arrangement of the information processing apparatus according to the first embodiment of the present invention.

FIG. 2 is a block diagram showing the arrangement of the file server apparatus 101 or 105 according to this embodiment.

Referring to FIG. 2, each of the file server apparatuses 101 and 105 includes a CPU (Central Processing Unit) 201, ROM (Read Only Memory) 202, RAM (Random Access Memory) 203, storage unit 204, operation panel 205, display unit 206, LAN interface (LAN I/F) 207, LAN line 208, USB interface (USB I/F) 209, and USB 210.

The CPU 201 is a system control unit which controls the entire file server apparatus. The ROM 202 stores the control program of the CPU 201 and various kinds of permanent data. The RAM 203 includes an SRAM or DRAM and stores program control variables and the like. Various kinds of setting parameters and various kinds of working buffers are also stored in the RAM 203. The storage unit 204 includes a hard disk and stores data file such as document files and image files. The operation panel 205 includes a keyboard or touch panel. The operator executes various kinds of input operations through the operation panel 205. The display unit 206 includes an LCD (Liquid Crystal Display) or LED (Light-Emitting Diode). Display or notification for the operator is done on the display unit 206. The LAN I/F 207 is an interface to be connected to the LAN line 208. The USB I/F 209 is an interface to be connected to the USB 210.

The arrangement shown in FIG. 2 is part of the information processing apparatus according to this embodiment. A scanner unit, printer unit, modem, loudspeaker, or the like may be added to the apparatus arrangement. If the present invention is implemented by software, the apparatus need not always incorporate the blocks shown in FIG. 2.

FIG. 3 is a view showing an example of structured document files stored in the storage unit 204 of the file server apparatus 101 or 105.

As shown in FIG. 3, the structured document file is a text file described by the XML format. Referring to FIG. 3, "./img/sample.jpg" is designated as the attribute value of xlink:href attribute of an image element. This means link information to an external file. That is, the image file "./img/sample.jpg" is referred to from the structured document file by the description of link information.

FIG. 4 is a view showing a state in which the image file linked from the structured document file shown in FIG. 3 is embedded in the structured document file.

The description method shown in FIG. 4 is called embedding. In the example shown in FIG. 4, the JPEG image at the link destination is converted into text data by the Base64 format and described in the structured document file.

In this embodiment, a plurality of files are put into a file by using tar (Tape Archival and Retrieval format), although the archiving method is not illustrated.

Instead of tar, ZIP or LHA may be used. In addition, the files may be compressed in archiving.

The operation of the file server apparatus 101 according to this embodiment when it transmits a structured document file to an external apparatus through the LAN 102 will be described below.

In this embodiment, the protocol for transmission is not particularly limited. TCP (Transmission Control Protocol)/IP (Internet Protocol), HTTP (Hyper Text Transfer Protocol), or FTP (File Transfer Protocol) may be used. Alternatively, e-mail may be used.

In this embodiment, control is switched depending on whether the file linked from the structured document file is present in the apparatus itself (in the apparatus of the transmission source).

The operation of the file server apparatus 101 according to this embodiment will be described below on the basis of FIG. 5.

Figure 5:
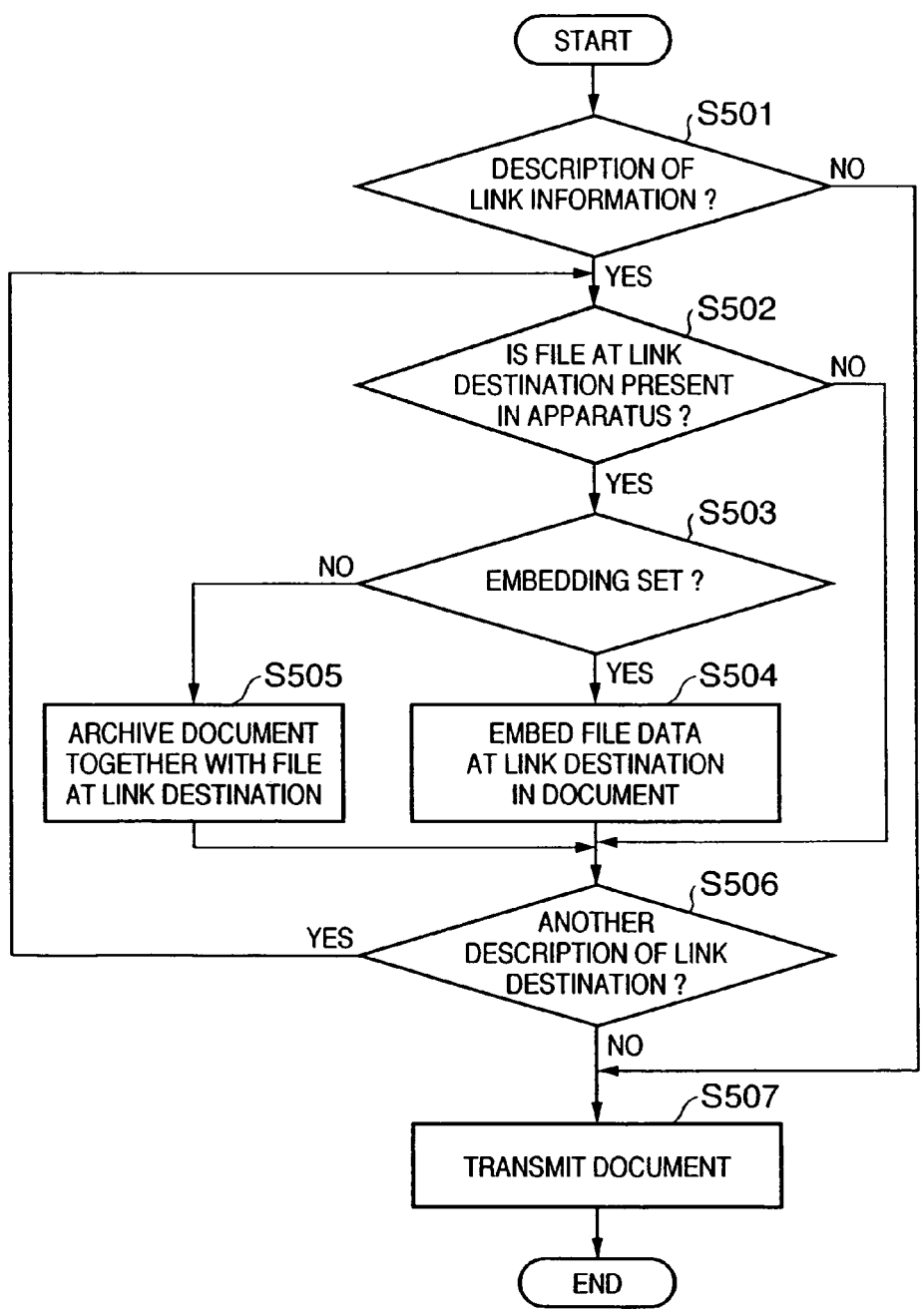
FIG. 5 is a flowchart showing the flow of operation of the information processing apparatus according to the first embodiment of the present invention.

FIG. 5 is a flowchart showing the flow of operation of the file server apparatus 101 according to this embodiment.

When the file server apparatus 101 according to this embodiment is going to transmit data at the link destination together with the structured document file, the operator can set one of three methods of "embedding the data at the link destination in the structured document file", "archiving the file together with the data at the link destination", and "transmitting the file without manipulation". When the method of "transmitting the file without manipulation" is set, the operation is almost the same as the conventional operation, and a description thereof will be omitted.

The operation executed when the method of "embedding the data at the link destination in the structured document file" or "archiving the file together with the data at the link destination" will be described below.

Referring to FIG. 5, in step S501, before transmitting a structured document file, the file server apparatus 101 according to this embodiment loads the structured document file from its head and determines whether a description of link information is present. If NO in step S501, the flow advances to step S507 to transmit the structured document file without manipulation. Then, the processing operation is ended.

If YES in step S501, the flow advances to step S502. The file server apparatus 101 determines whether the structured document file at the link destination described there is present in itself, i.e., whether the structured document file located at the link destination described in the structured document file is present in the storage unit 204 of the file server apparatus 101. Whether the structured document file located at the link destination is present in the apparatus of the transmission source of the structured document file can be determined generally on the basis of the character string of the file path described as the link information.

If NO in step S502, it can be determined that the structured document file can be referred to from the transmission partner. Since no embedding or archiving is necessary, the flow advances to step S506.

If YES in step S502, the flow advances to step S503. The file server apparatus 101 determines whether the method of "embedding the data at the link destination in the structured document file" is set. This setting can be selected by the operator in advance, as described above.

If YES in step S503, the flow advances to step S504. The file server apparatus 101 converts the file at the link destination into text data by the Base64 format and embeds it in the structured document file. Then, the flow advances to step S506.

If NO in step S503, it means that the method of "archiving the file together with the data at the link destination" is set. The flow advances to step S505. The file server apparatus 101 archives the structured document file together with the file at the link destination. Then, the flow advances to step S506.

In archiving in step S505, when the file path indicating the file at the link destination is described as an absolute path, it is changed to a description by a relative path. For example, when a data file is designated by a description by an absolute path "/home/user/image/sample/jpg", it is changed to a description by a relative path "./sample.jpg" at the time of archiving. This is because the relative positional relationship of the file at the link destination changes upon archiving.

In step S506, it is determined whether another description of link information is present in the structured document file. If YES in step S506, the processing from step S502 is repeated.

If NO in step S506, it means that all processing operations for the link information are complete. The flow advances to step S507 to transmit the structured document file which has undergone embedding or archiving to the partner. Then, the processing operation is ended.

In embedding in step S504 or archiving in step S505, to maintain the state of the original file, manipulation is executed for a copy of the structured document file, and the manipulated file is transmitted to the partner in step S507, although this processing is not illustrated in the flowchart in FIG. 5. After the transmission, the manipulated file is unnecessary and is deleted.

As described above, according to the information processing apparatus of this embodiment, the data of the file at the link destination is embedded or archiving is executed in accordance with the situation. Accordingly, when a structured document file is transmitted to another apparatus or application, the probability of a partner being incapable of referring to data at a link destination can be minimized. In addition, the risk of transmission of data unnecessary for the partner can also be minimized. In addition, any wasteful data transmission can be suppressed by reducing the file size of the image at the link destination in accordance with the situation. Furthermore, when the manager of the apparatus or the creator of the structured document file has an intention to avoid transmission of the data at the link destination to the partner or execute embedding or archiving and then transmit the file, this information is described in the structured document file. Hence, the apparatus can properly cope with the intention.

B. Second Embodiment

The second embodiment of the present invention will be described next on the basis of FIG. 6.

The arrangement of an information processing apparatus according to this embodiment and that of an information processing system comprising the information processing apparatus are the same as those shown in FIGS. 1 and 2 of the above-described first embodiment. A description will be done with reference to FIGS. 1 and 2 as needed.

In step S602 of this embodiment, control is switched depending on whether a data file linked from a structured document file is present on the network. It is determined as follows whether or not the file is present on the network. If a file path description to be embedded in the structured document file includes "http:// . . . ", the file is determined to be present on the network. If there exist a file path of "file:// . . . " or " . . . /usr/data/file.jpg", the file is determined to be present locally in the apparatus of the transmission source of the structured document file.

The operation of a file server apparatus 101 as the information processing apparatus according to this embodiment will be described below on the basis of FIG. 6.

Figure 6:
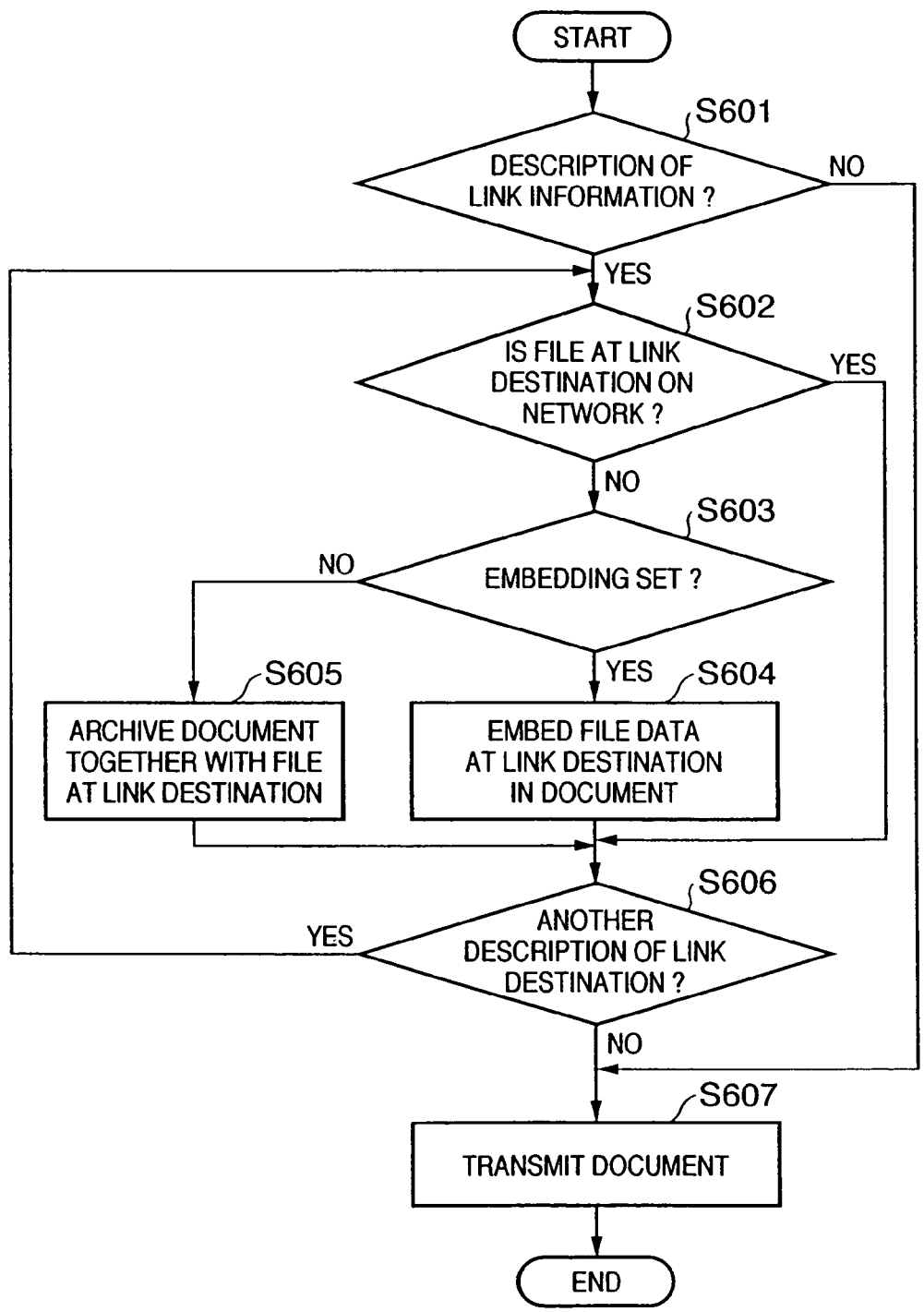
FIG. 6 is a flowchart showing the flow of operation of an information processing apparatus according to the second embodiment of the present invention.

FIG. 6 is a flowchart showing the flow of operation of the file server apparatus 101 as the information processing apparatus according to this embodiment.

As in the above-described first embodiment, when the file server apparatus 101 according to this embodiment is going to transmit data at a link destination together with a structured document file, the operator can set one of three methods of "embedding the data at the link destination in the structured document file", "archiving the file together with the data at the link destination", and "transmitting the file without manipulation".

The operation executed when the method of "embedding the data at the link destination in the structured document file" or "archiving the file together with the data at the link destination" is set will be described below.

The second embodiment is different from the first embodiment only in processing in step S602 in FIG. 6. More specifically, in the first embodiment, it is determined whether the file at the link destination is present in the file server apparatus itself (step S502 in FIG. 5). In the second embodiment, however, it is determined whether the file at the link destination is present on the network (step S602 in FIG. 6).

If YES in step S602, it can be determined that the file can be referred to from the transmission partner. Hence, no embedding or archiving is necessary.

The operation from step S603 in FIG. 6 is the same as the operation from step S503 in FIG. 5, and a description thereof will be omitted.

As another modification, the terminal apparatus of the transmission source may inquire of a data file management server (not shown) about the presence/absence of an access right to the data file. If it is determined that no access right is present, the data file at the link destination may be transmitted.

In the management server, a table indicative whether or not each terminal apparatus has the access right to the data file (or a folder of storing the data file) is stored in a storage medium. Identifiers which are stored in the table include domain names, IP addresses, mail addresses etc. In alternative case, the table may be provided in a storage medium of the terminal apparatus of the transmission source.

C. Third Embodiment

The third embodiment of the present invention will be described next on the basis of FIG. 7.

The arrangement of an information processing apparatus according to this embodiment and that of an information processing system comprising the information processing apparatus are the same as those shown in FIGS. 1 and 2 of the above-described first embodiment. A description will be done with reference to FIGS. 1 and 2 as needed.

In this embodiment, control is switched depending on whether the transmission partner is connected to the network.

The operation of a file server apparatus 101 as the information processing apparatus according to this embodiment will be described below on the basis of FIG. 7.

Figure 7:
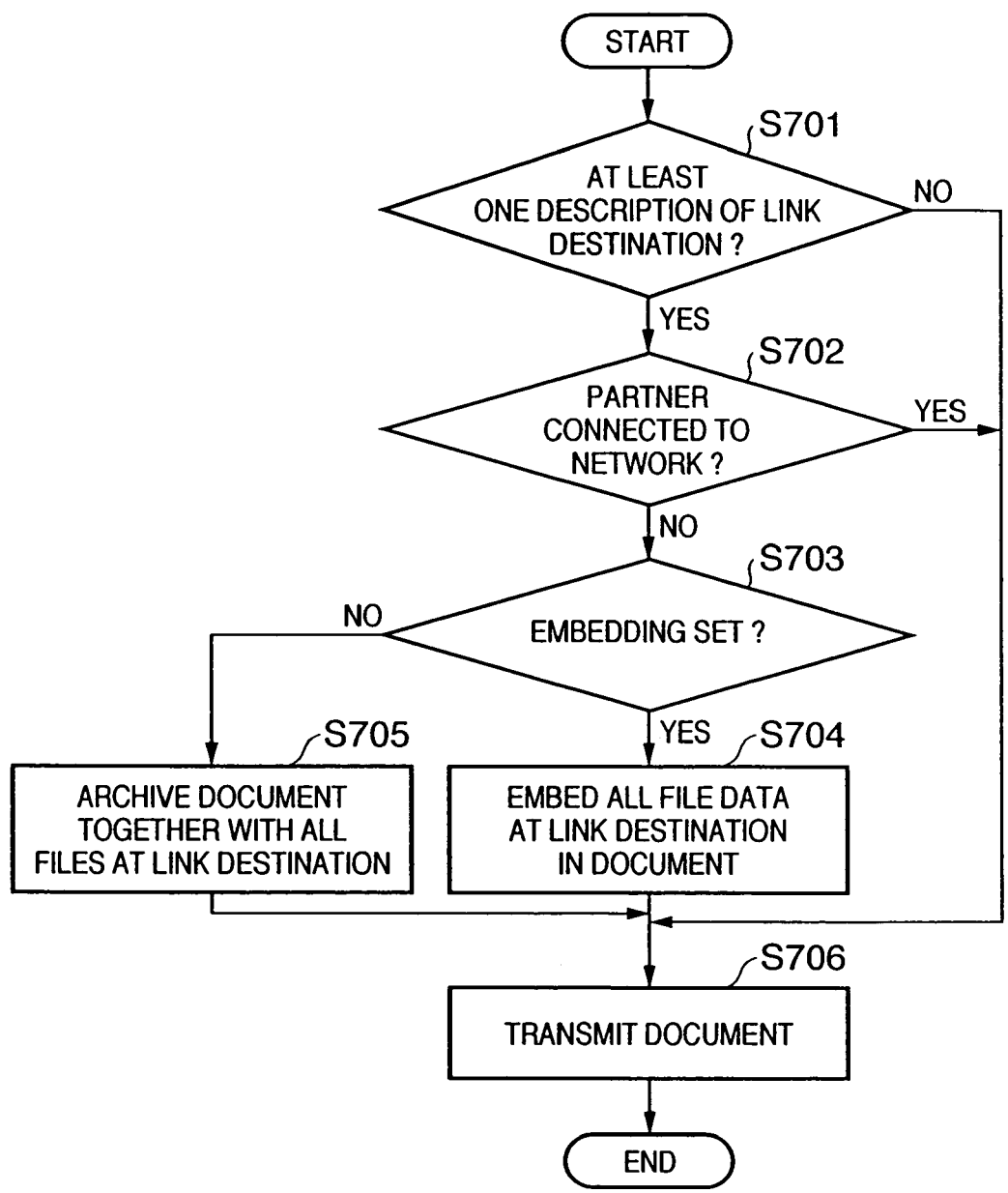
FIG. 7 is a flowchart showing the flow of operation of an information processing apparatus according to the third embodiment of the present invention.

FIG. 7 is a flowchart showing the flow of operation of the file server apparatus 101 according to this embodiment.

As in the above-described first and second embodiments, when the file server apparatus 101 according to this embodiment is going to transmit data at a link destination together with a structured document file, the operator can set one of three methods of "embedding the data at the link destination in the structured document file", "archiving the file together with the data at the link destination", and "transmitting the file without manipulation".

The operation executed when the method of "embedding the data at the link destination in the structured document file" or "archiving the file together with the data at the link destination" is set will be described below.

Referring to FIG. 7, before transmitting a structured document file, the file server apparatus 101 according to this embodiment determines in step S701 whether at least one description of link information of the data file is present in the structured document file. If NO in step S701, the flow advances to step S706. The file server apparatus 101 transmits the structured document file without manipulation. Then, the processing operation is ended.

If YES in step S701, the flow advances to step S702. The file server apparatus 101 determines whether the transmission partner is an apparatus connected to the network.

A detailed description of the method of determining whether the transmission partner is an apparatus connected to the network will be omitted in this embodiment. For example, if the file server apparatus detects that it is connected to the partner through a USB, i.e., if the partner is a PDA 103 shown in FIG. 1, it can be determined that the partner is not connected to the network. If the file server apparatus is connected to the partner through a LAN, i.e., if the partner is a PC 104 shown in FIG. 1, it can be determined that the partner is connected to the network. Alternatively, a means for notifying in the communication procedures to the partner whether the partner is connected to the network may be prepared. A device for acquiring the capability of the partner in the communication procedures to the partner may be used to determine whether the partner can be connected to the network. Information about the connection states of individual apparatuses may be stored in the file server apparatus 101 in advance.

In either case, when the partner is connected to the network, it can be determined that the data file at the link destination can be referred to from the transmission partner. Hence, no embedding or archiving is necessary. Hence, if YES in step S702, the flow advances to step S706. The file server apparatus 101 transmits the structured document file without manipulation.

If NO in step S702, the flow advances to step S703. The file server apparatus 101 determines whether the method of "embedding the data at the link destination in the structured document file" is set. This setting can be selected by the operator in advance, as described above.

If YES in step S703, the flow advances to step S704. The file server apparatus 101 sequentially converts all files at the link destination, which are linked from the structured document file, into text data by the Base64 format and embeds them in the structured document file. Then, the flow advances to step S706.

If NO in step S703, it means that the method of "archiving the file together with the data at the link destination" is set. The flow advances to step S705. The file server apparatus 101 archives the structured document file together with all files at the link destination, which are linked from the structured document file. Then, the flow advances to step S706. The file server apparatus 101 transmits the structured document file which has undergone embedding or archiving to the partner. Then, the processing operation is ended.

D. Fourth Embodiment

The fourth embodiment of the present invention will be described next on the basis of FIG. 8.

The arrangement of an information processing apparatus according to this embodiment and that of an information processing system comprising the information processing apparatus are the same as those shown in FIGS. 1 and 2 of the above-described first embodiment. A description will be done with reference to FIGS. 1 and 2 as needed.

In this embodiment, control is switched in accordance with information from the transmission partner. The operation of a file server apparatus 101 as the information processing apparatus according to this embodiment will be described below on the basis of FIG. 8.

Figure 8:
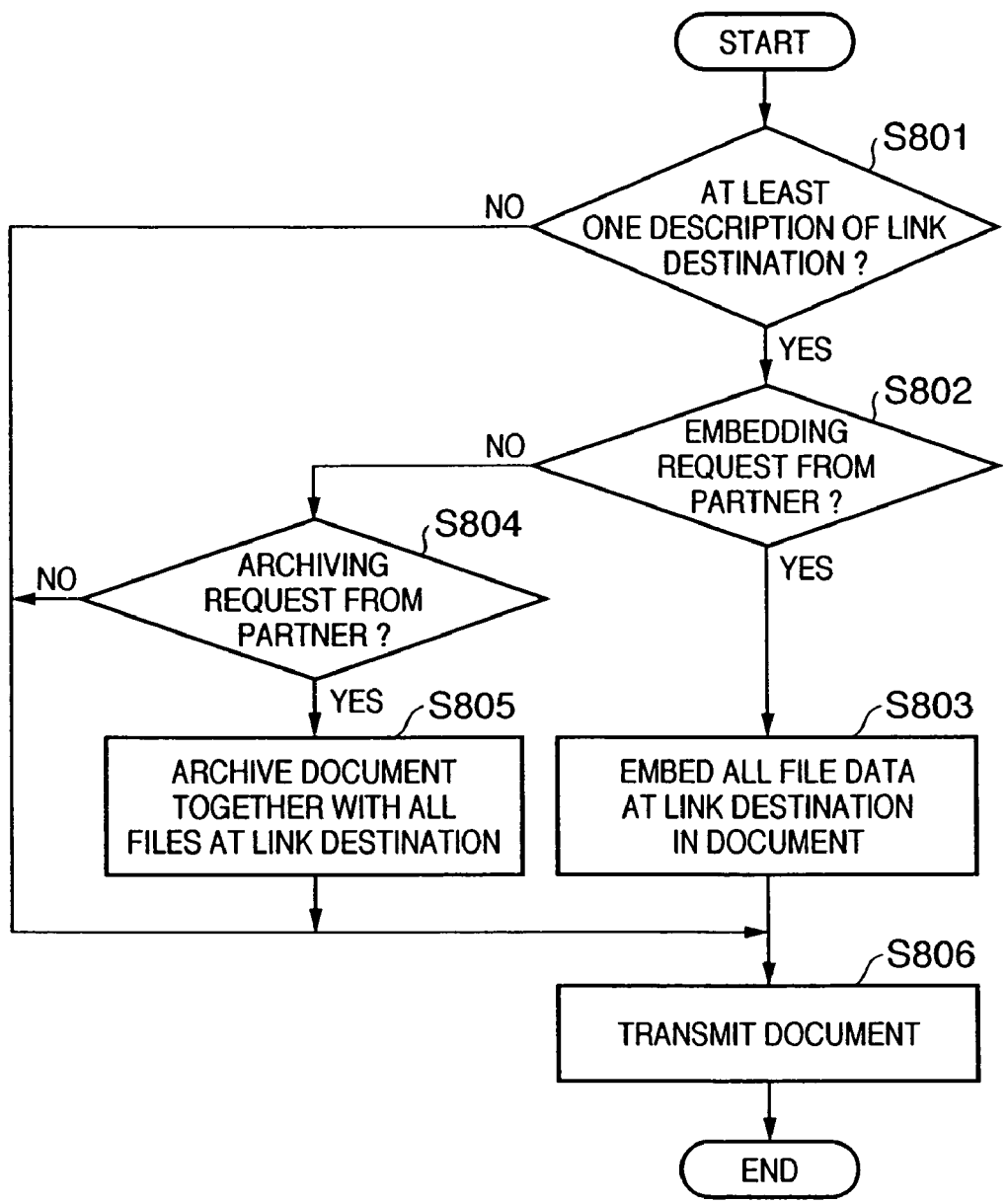
FIG. 8 is a flowchart showing the flow of operation of an information processing apparatus according to the fourth embodiment of the present invention.

FIG. 8 is a flowchart showing the flow of operation of the file server apparatus 101 according to this embodiment.

In the file server apparatus 101 according to this embodiment, a device which receives a request from the partner in advance in the communication procedures is prepared. More specifically, the file server apparatus 101 has an arrangement to, before a structured document file is transmitted to the partner, receive an embedding request signal or archiving request signal transmitted from the partner. The arrangement to receive the signals is not important in this embodiment and is not illustrated in the flowchart in FIG. 8. The processing shown in FIG. 8 indicates the flow of operation in transmitting a structured document file.

Referring to FIG. 8, before transmitting a structured document file, the file server apparatus 101 according to this embodiment determines in step S801 whether a description of link information is present in the structured document file. If no description of link information is detected in step S801, the flow advances to step S806. The file server apparatus 101 transmits the structured document file without manipulation.

If it is determined in step S801 that at least one description of link information is present, the flow advances to step S802. The file server apparatus 101 determines whether a link file embedding request is received from the transmission partner. If YES in step S802, the flow advances to step S803. The file server apparatus 101 sequentially converts all files at the link destination, which are linked from the structured document file, into text data by the Base64 format and embeds them in the structured document file.

If NO in step S802, the flow advances to step S804. The file server apparatus 101 determines whether a link file archiving request is received from the transmission partner. If YES in step S804, the flow advances to step S805. The file server apparatus 101 archives the structured document file together with all data files at the link destination, which are linked from the structured document file. Then, the flow advances to step S806. The file server apparatus 101 transmits the structured document file which has undergone embedding or archiving to the partner. Then, the processing operation is ended.

If NO in step S804, the flow advances to step S806. The file server apparatus 101 transmits the structured document file to the partner without embedding or archiving the file at the link destination. Then, the processing operation is ended.

E. Fifth Embodiment

The fifth embodiment of the present invention will be described next on the basis of FIG. 9.

The arrangement of an information processing apparatus according to this embodiment and that of an information processing system comprising the information processing apparatus are the same as those shown in FIGS. 1 and 2 of the above-described first embodiment. A description will be done with reference to FIGS. 1 and 2 as needed.

In this embodiment, control is switched in accordance with a description in a structured document file.

The operation of a file server apparatus 101 as the information processing apparatus according to this embodiment will be described below on the basis of FIG. 9.

Figure 9:
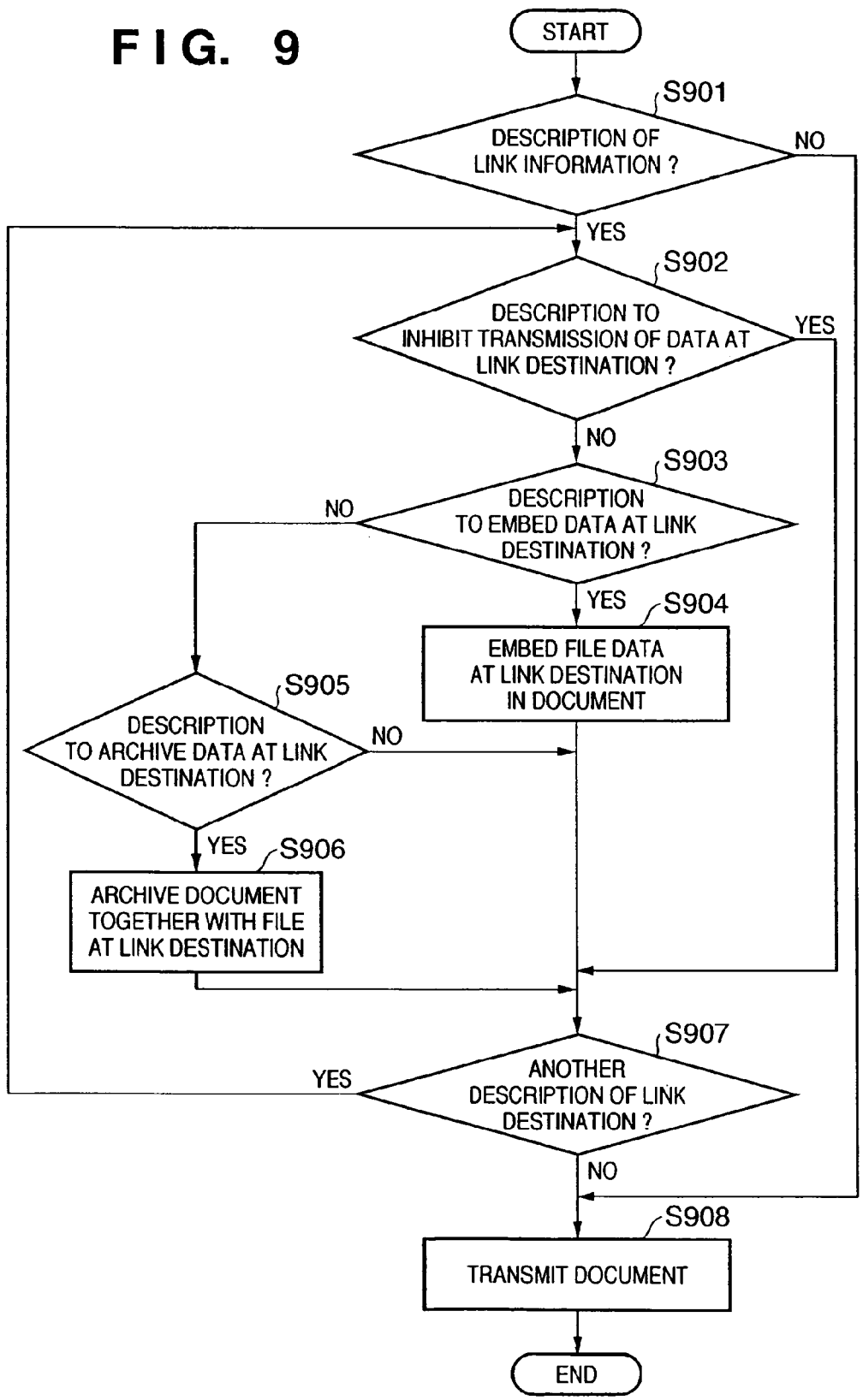
FIG. 9 is a flowchart showing the flow of operation of an information processing apparatus according to the fifth embodiment of the present invention.

FIG. 9 is a flowchart showing the flow of operation of the file server apparatus 101 according to this embodiment.

A structured document file processed by the file server apparatus 101 according to this embodiment can contain a description to distinguish between whether to permit transmission of the data file located at the link destination, embed the file at the link destination in the structured document file at the time of transmission, and archive the file at the link destination at the time of transmission. For example, in a structured document file shown in FIG. 3, a description "send—"YES"" in the image element means that transmission of the file linked from this element is permitted. If this description is "send—"NO"", transmission of the file linked from this element is inhibited.

In addition, in the structured document file shown in FIG. 3, a description "embed—"YES"" in the image element means that the data file linked from this element should be embedded in the structured document file at the time of transmission. If this description is "embed—"NO"", the data file linked from this element should not be embedded in the structured document file at the time of transmission.

Although not illustrated in FIG. 3, if there is a description "archive—"YES"" in the image element, it means that the data file linked from this element should be archived together with the structured document file at the time of transmission. If there is a description "archive—"NO"" in the image element, it means that the file linked from this element should not be archived together with the structured document file at the time of transmission. How to determine and process these descriptions is left to the application. In this embodiment, control is switched in accordance with the description.

Referring to FIG. 9, before transmitting a structured document file, in step S901, the file server apparatus 101 according to this embodiment loads the structured document file from its head and determines whether a description of link information is present. If NO in step S901, the flow advances to step S908. The file server apparatus 101 transmits the structured document without manipulation.

If YES in step S901, the flow advances to step S902. The file server apparatus 101 determines whether the description of link information of the data file contains a description to inhibit transmission of data of the file at the link destination. That is, the file server apparatus 101 determines whether a description "send="NO"" is present.

If YES in step S902, the flow advances to step S907 without executing processing for the data file located at the link destination.

If NO in step S902, the flow advances to step S903. The file server apparatus 101 determines whether a description to embed the data of the data file at the link destination is present. That is, the file server apparatus 101 determines whether a description "embed="YES"" is present. If YES in step S903, the flow advances to step S904. The file server apparatus 101 converts the data file located at the link destination into text data by the Base64 format and embeds it in the structured document file. Then, the flow advances to step S907.

If NO in step S903, the flow advances to step S905. The file server apparatus 101 determines whether a description to archive the file at the link destination is present. That is, the file server apparatus 101 determines whether a description "archive="YES"" is present. If YES in step S905, the flow advances to step S906. The file server apparatus 101 archives the structured document file together with the file located at the link destination. Then, the flow advances to step S907.

If NO in step S905, the flow advances to step S907 without executing processing for the file at the link destination.

In step S907, it is determined whether another description of link information is present. If YES in step S907, the file server apparatus 101 executes the processing from step S902.

If NO in step S907, it means that all processing operations for the link information are complete. The flow advances to step S908. The file server apparatus 101 transmits the structured document file which has undergone embedding or archiving to the partner. Then, the processing operation is ended.

The first to fifth embodiments have been described above. Two or more embodiments may be combined. For example, only when request for embedding data of the linked data file is received from the partner, and the description to embed the data file located at the link destination is present in the structured document file, the data file located at the link destination may be embedded.

F. Sixth Embodiment

The sixth embodiment of the present invention will be described next on the basis of FIG. 10.

The arrangement of an information processing apparatus according to this embodiment and that of an information processing system comprising the information processing apparatus are the same as those shown in FIGS. 1 and 2 of the above-described first embodiment. A description will be done with reference to FIGS. 1 and 2 as needed.

In this embodiment, examples of processing for embedding data of the data file or archiving the data file located at a link destination will be described. That is, the sixth embodiment is related to the above-described operation in step S504 or S505 in FIG. 5, step S604 or S605 in FIG. 6, step S704 or S705 in FIG. 7, step S803 or S805 in FIG. 8, or step S904 or S906 in FIG. 9.

The operation of a file server apparatus 101 as the information processing apparatus according to this embodiment will be described below on the basis of FIG. 10.

Figure 10:
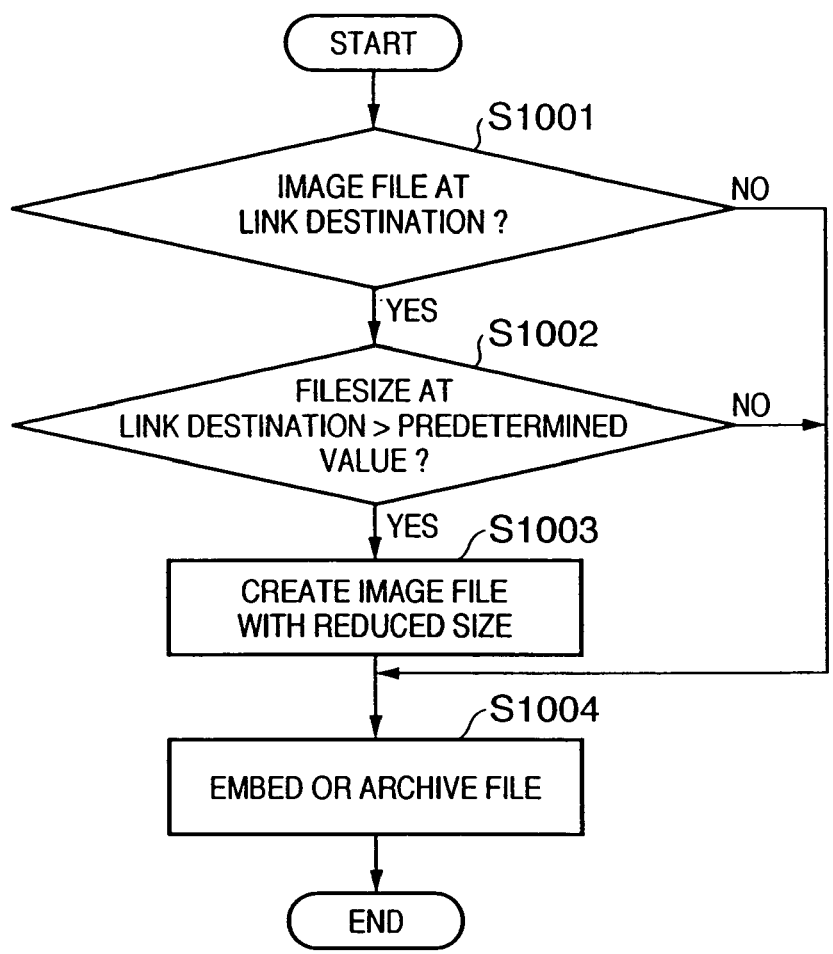
FIG. 10 is a flowchart showing the flow of operation of an information processing apparatus according to the sixth embodiment of the present invention.

FIG. 10 is a flowchart showing the flow of operation of the file server apparatus 101 according to this embodiment.

The file server apparatus 101 according to this embodiment executes processing to be described below to embed or archive a file at a link destination.

Referring to FIG. 10, the file server apparatus 101 determines in step S1001 whether the file at the link destination described in link information is an image file. In this case, whether the file at the link destination described in link information is an image file is determined by analyzing the data of the file at the link destination. This determination may be done on the basis of the extension of the file or the storage location of the file.

If NO in step S1001, the flow advances to step S1004. The file server apparatus 101 executes embedding or archiving without special manipulation.

If YES in step S1001, the flow advances to step S1002. The file server apparatus 101 determines whether the size of the file at the link destination is more than a predetermined value. The predetermined value is a value the operator can set in the apparatus in advance. Assume that the predetermined value is set to 1 MB (megabyte). In this case, it is determined in step S1002 whether the size of the image file is more than 1 MB.

If YES in step S1002, the flow advances to step S1003. The file server apparatus 101 creates an image file in a smaller size. The flow advances to step S1004 to embed or archive the image file. Then, the processing operation is ended.

If NO in step S1002, the flow skips step S1003 and jumps to step S1004. The file server apparatus 101 executes embedding or archiving without changing the file size. Then, the processing operation is ended.

In the processing in step S1003, to reduce the file size, the resolution of the image file is decreased, or the number of colors is decreased.

The file size may be reduced by simply compressing the file or changing the image format, although this method is not used in this embodiment.

In the processing in steps S1002 and S1003, the processing is changed in accordance with the size of the file at the link destination. Instead, whether the file size is to be reduced may be determined in accordance with a request from the partner or a description in the structured document file.

The file size may always be reduced without executing the processing in step S1002.

G. Other Embodiment

The embodiments of the present invention have been described above. The present invention is not limited to these embodiments. The present invention can be applied to any other arrangement which can achieve the functions defined in the appended claims or the functions of the embodiments.

In the above-described embodiments, an XML file has been described as an example of the structured document file. However, the present invention can be applied to process any other structured document file such as an HTML file.

The above-described operation is executed by the CPU 201 on the basis of the program stored in the ROM 202 or RAM 203. In the present invention, the computer-executable program may be stored in a computer-readable storage medium such as a floppy disk, a hard disk, a CD-ROM, or a memory card, loaded in an information processing apparatus, such as a computer, using a dedicated data reading apparatus, and be executed by the CPU 201.

In the above-described embodiments, a file server apparatus has mainly been described as an example. However, the present invention is not limited to this. The present invention can also be applied to various kinds of server apparatuses such as an HTTP server apparatus and FTP server apparatus, communication apparatuses such as a cellular phone and facsimile apparatus, document processing apparatuses such as digital copying machine, printer, and scanner apparatus, or a device controller in an information processing apparatus such as a computer.

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium. In this case, the program codes read out from the storage medium implement the new functions of the present invention by themselves, and the storage medium which stores the program codes and the program constitute the present invention.

As the storage medium for supplying the program codes, for example, a flexible disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

The present application claims priority under 35 U.S.C. §119 from Japanese Patent Application No. 2003-383025 filed on Nov. 12, 2003, the entire contents of which are hereby incorporated by reference herein.

What is claimed is:

1. An information processing method performed by an information processing apparatus that includes a central processing unit for transmitting, to a partner apparatus over a network, document data that includes link information for referring to reference data at a link destination external to the document data, the method comprising steps of:
   receiving at least one of an embedding request and an archiving request from the partner apparatus;
   embedding the reference data into the document data, upon determining that the embedding request is received, that a description to embed the reference data is present in the document data, and that the link information does not include a description to inhibit transmission of the reference data at the link destination;
   archiving the reference data together with the document data, upon determining that the archiving request is received, that a description to archive the reference data is present in the document data, and that the link information does not include a description to inhibit transmission of the reference data at the link destination; and
   transmitting, to the partner apparatus, (i) the document data into which the reference data is embedded, upon determining that the embedding request is received and (ii) the document data with which the reference data is archived, upon determining that the archiving request is received,
   wherein at least one of the above steps is performed, at least in part, by the central processing unit.

2. The method according to claim 1, wherein, in the transmitting step, the document data that is not archived in the archiving step is transmitted, upon determining that the reference data external to the document data is not data in the information processing apparatus.

3. The method according to claim 1, wherein, in the transmitting step, the document data that is not archived in the archiving step is transmitted, upon determining that the reference data external to the document data is not data on the network.

4. The method according to claim 1, wherein, in the transmitting step, the reference data external to the document data is not transmitted, upon determining that there is a description in the document data to be transmitted that indicates that transmission of the reference data external to the document data is prohibited.

5. The information processing method according to claim 1, wherein the document data is transmitted without embedding or archiving, upon determining that neither the embedding request nor the archiving request is received from the partner apparatus.

6. The information processing method according to claim 1, wherein the document data is transmitted without embedding or archiving, upon determining that the partner apparatus is on the network.

7. The information processing method according to claim 1, further comprising steps of:
   determining whether the reference data corresponds to an image; and
   reducing a size of the image corresponding to the reference data, upon determining that the reference data corresponds to the image.

8. The information processing method according to claim 7, wherein the size of the image is reduced, upon determining that the size of the image is larger than a predetermined value.

9. The information processing method according to claim 1, wherein an absolute path description included in the link information is changed to a relative path description.

10. An information processing method according to claim 1, further comprising:
    determining whether the document data includes a description to embed other reference data into the document data,
    wherein the document data into which the other reference data is embedded is transmitted to the partner apparatus upon determining that the document data includes the description to embed the other reference data into the document data.

11. An information processing method according to claim 1, further comprising:
    determining whether the document data includes a description to archive the other reference data with the document data,
    wherein the document data with which the other reference data is archived is transmitted to the partner apparatus upon determining that the document data includes the description to archive the other reference data with the document data.

12. An information processing apparatus that transmits, to a partner apparatus over a network, document data that includes link information for referring to reference data at a link destination external to the document data, the apparatus comprising:
    a central processing unit coupled to a computer memory,
    wherein the central processing unit is configured to receive at least one of: an embedding request and an archiving request from the partner apparatus;
    wherein the central processing unit is configured to embed the reference data into the document data, upon the central processing unit determining that the embedding request is received, that a description to embed the reference data is present in the document data, and that the link information does not include a description to inhibit transmission of the reference data at the link destination,
    wherein the central processing unit is configured to archive the reference data together with the document data, upon the central processing unit determining that the archiving request is received, that a description to archive the reference data is present in the document data, and that the link information does not include a description to inhibit transmission of the reference data at the link destination, and
    wherein the central processing unit is configured to transmit, to the partner apparatus, (i) the document data into which the reference data is embedded, upon the central processing unit determining that the embedding request is received and (ii) the document data with which the reference data is archived, upon the central processing unit determining that the archiving request is received.

13. A non-transitory computer-readable storage medium storing a computer-executable program that, when executed by a computer processor, causes the computer processor to perform a method for transmitting, to a partner apparatus over a network, document data that includes link information for referring to reference data at a link destination external to the document data, the method comprising:
    receiving at least one of: an embedding request and an archiving request from the partner apparatus;
    embedding the reference data into the document data, upon determining that the embedding request is received, that a description to embed the reference data is present in the document data, and that the link information does not include a description to inhibit transmission of the reference data at the link destination;

archiving the reference data together with the document data, upon determining that the archiving request is received, that a description to archive the reference data is present in the document data, and that the link information does not include a description to inhibit transmission of the reference data at the link destination; and transmitting, to the partner apparatus, (i) the document data into which the reference data is embedded, upon determining that the embedding request is received and (ii) the document data with which the reference data is archived, upon determining that the archiving request is received.

* * * * *